May 20, 1924.
C. SCHENCK ET AL
1,494,814
METAL WHEEL
Filed Jan. 17, 1921    2 Sheets-Sheet 1
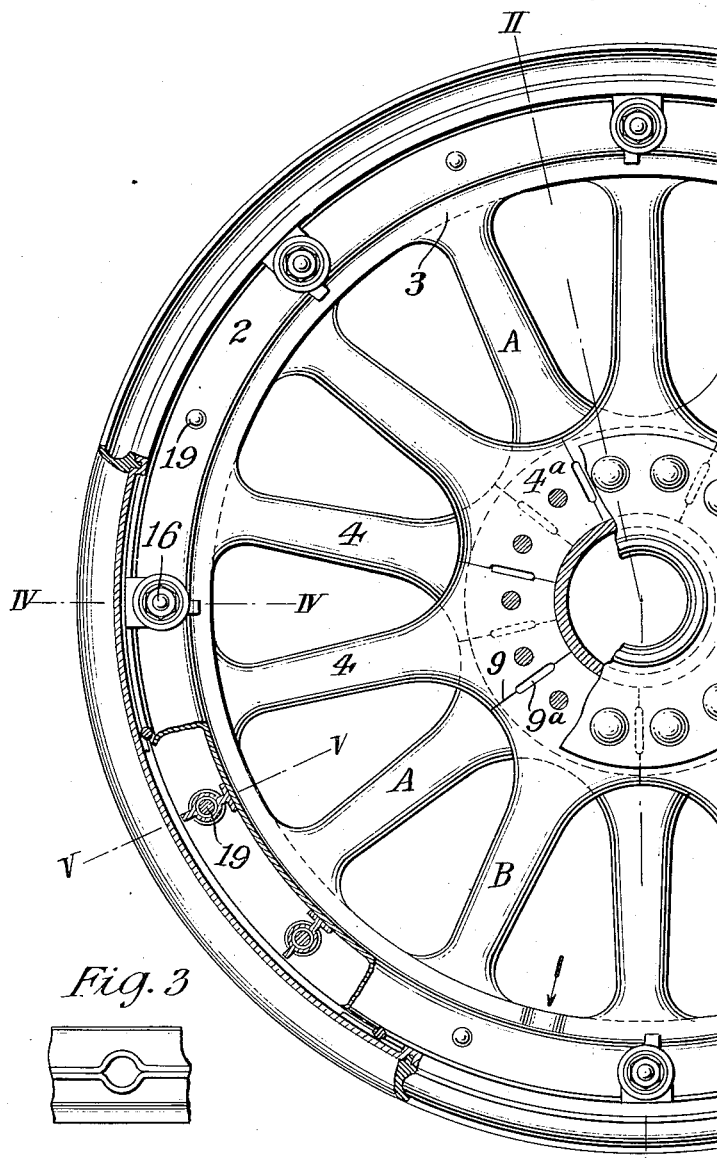
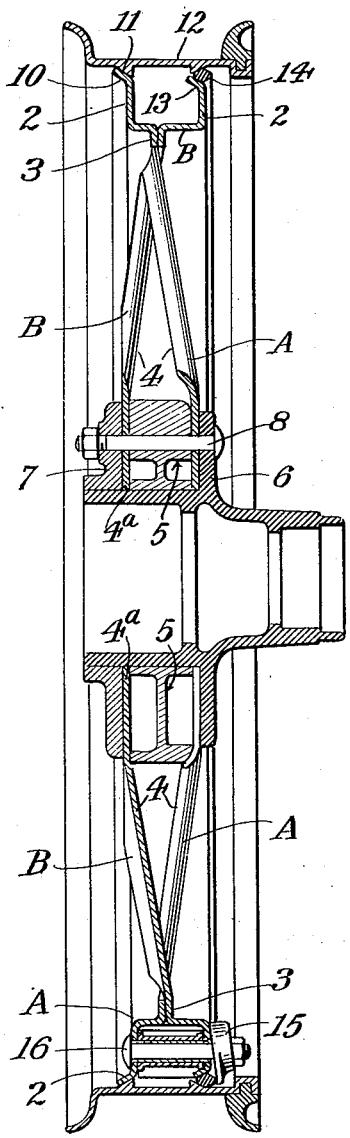
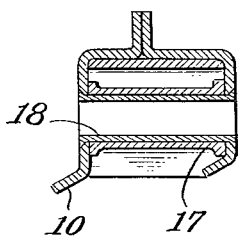
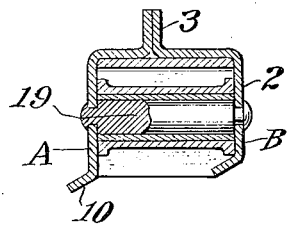
INVENTORS
Charles Schenck,
BY Lewis Fiene, and
Emil Ibach
Clarence Starr
ATTORNEY May 20, 1924.
C. SCHENCK ET AL
1,494,814
METAL WHEEL
Filed Jan. 17, 1921     2 Sheets-Sheet 2
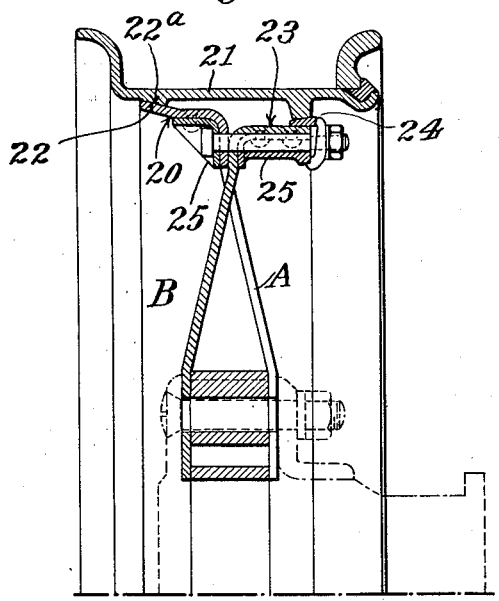
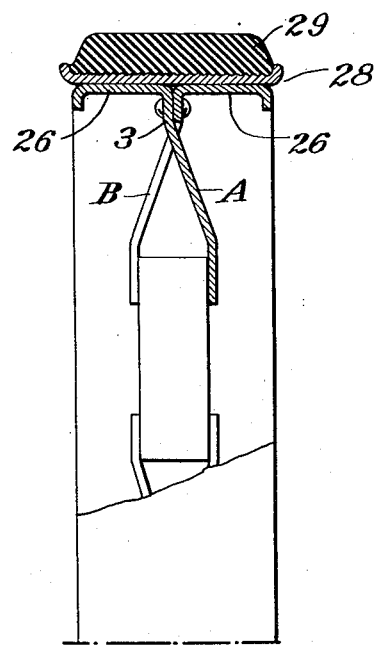
Inventors
Charles Schenck,
Lewis Fine and
By Emil Ibach
Clarence D Kerr
Attorney Patented May 20, 1924.

1,494,814

UNITED STATES PATENT OFFICE.

CHARLES SCHENCK, LEWIS FINE, AND EMIL IBACH, OF BETHLEHEM, PENNSYLVANIA, ASSIGNORS TO BETHLEHEM STEEL COMPANY, OF BETHLEHEM, PENNSYLVANIA, A CORPORATION OF PENNSYLVANIA.

METAL WHEEL.

Application filed January 17, 1921. Serial No. 437,644.

*To all whom it may concern:*

Be it known that we, CHARLES SCHENCK and LEWIS FINE, citizens of the United States, and EMIL IBACH, a citizen of the Republic of Germany, all residing at Bethlehem, Northampton County, Pennsylvania, have jointly invented new and useful Improvements in Metal Wheels, of which the following is a specification, reference being had to the accompanying drawings, in which—

Fig. 1 is a plan of a metal wheel embodying our invention; Fig. 2 is a section on line II—II of Fig. 1; Fig. 3 is a detail of the valve hole; Fig. 4 is a section on line IV—IV of Fig. 1; Fig. 5 is a section on line V—V of Fig. 1; and Figs. 6 and 7 show, respectively, sections of modified forms of our invention.

Our invention relates to metal wheels of the staggered spoke type, and comprises a wheel in which the spokes, rim seat and the connecting web are preferably formed of two pieces of metal. A set of spokes on one side of the wheel is attached to the section of the felloe on the opposite side of the wheel, and vice versa, so that the spokes are not only staggered but are crossed adjacent to the felloe. Our invention also consists in the various features which we shall hereinafter describe and claim.

Referring to the drawings, the wheel is comprised of two sections of metal A and B, each of which is formed with a felloe portion 2, a web portion 3, and spoke portions 4. The spokes of each section are splayed or bent out of the axial plane of the web 3, the spokes being bent in a direction opposite to that in which the felloe portion 2 of the same section is bent, so that when the sections A and B are assembled together the felloe portion 2 will lie on the opposite side of the wheel from its attached spoke portion 4. The web portions 3 of the wheel are secured together by any suitable means, such as continuous or spot welding. The inner ends 4ᵃ of the spokes are of keystone shape and are secured against the sides of the spacer 5 by the hub flanges 6 and 7 and by the bolts 8. The meeting faces 9 of adjacent spokes are recessed as at 9ᵃ, so as to obviate the necessity for an accurate fit along the whole of the length of the adjacent side faces 9 of the spoke ends 4ᵃ.

The two felloe portions of the sections A and B when brought together form a U-section, and the edge 2 on the section A is inclined to provide a wedge seat 10, against which a complementary inclined face 11 on the rim 12 is intended to bear. The end of the felloe portion 2 on the section B is also inclined to provide a bearing 13 for the wedge ring 14, which is held in place by the wedge clips 15 on the bolts 16. In order to reinforce the felloe against collapse, we have provided, as is shown in Fig. 4, reinforcing pieces 17 and sleeves 18 for the bolts 16.

In Fig. 5 we have shown an intermediate reinforcing member 19 arranged between the bolt reinforcements 17 and 18.

In Fig. 6 we have shown our invention applied to a truck wheel particularly adapted for pneumatic tires, in which the box or U-section is eliminated and the end 20 of the felloe portion of the section A is bent at a slight angle to the web of the rim 21 to provide a wedging seat 22 for the complementary inclined face 22ᵃ on the rim, and the felloe portion 23 on the section B is substantially parallel with the web of the rim 21 and affords a seat for the wedge ring 24. Brackets 25 act as stiffeners for the felloe and form a support for the bolt 16 and for the lower parts of the wedge clips 15, and also prevent the bolt heads from turning.

In Fig. 7 we have shown a further modification of our invention, which is particularly adapted to solid tire truck wheels. In this form the webs 3 of the sections A and B are shown riveted together and the felloe or rim seat portions 26 lie in the same plane and parallel to the axis of the wheel. The rim 28 and tire 29 may be driven on to the rim from either direction.

We have found that wheels formed in the manner just described have many advantages. They are substantially as light in weight as a wooden wheel of corresponding size with its iron felloe. The staggered and bent cross spokes are particularly well adapted to take care of side strain and skidding, since, when the felloe is pressed inward toward the body of the car, the outer row of spokes is in tension and causes the web joining the spokes to press against the web of the other section, and a large part of this strain is taken up by the two surfaces of the web pressing against each other, which tends to relieve the strain on the spot welding and bolts. A pressure in the opposite direction is taken up in a corresponding manner.

As the felloe and spokes of each section are integral, there are no crevices or cracks in which mud or water may gather. The valve hole location, as is shown in Fig. 3. is readily accessible and the valve stem is guarded and supported by the web under the felloe. As the webs are continuous, they act to stiffen and reinforce the felloe and rim of the wheel and serve to resist blows due to direct impact and distribute such blows more equally to the spokes than if each spoke was joined directly to the rim.

Wheels constructed in accordance with our invention afford a maximum resistance to torsional stresses by reason of the arrangement of the crossed and staggered spokes; the keystone shaped ends of the spoke, which give the effect of a continuous metal plate, particularly when welded together at the hub, and the stiffening of the mid sections of the spokes by reason of their arched shape.

We prefer to construct the wheels of the present invention in accordance with the method set forth in our copending application Serial No. 437,643 for improvements in metal wheels, filed of even date herewith.

The terms and expressions which we have employed are used as terms of description and not of limitation, and we have no intention, in the use of such terms and expressions, of excluding any equivalents of the features shown and described, or portions thereof, but recognize that various modifications are possible within the scope of the invention claimed.

What we claim is:

1. A metal wheel comprising two sections, each of which has felloe, web, and spoke portions, means for permanently securing the web portions together, the felloe portions complementing each other to form a rim seat, the felloe portion of each section being arranged on a side of the axial plane of the wheel opposite to that in which the spoke portion of the same section is arranged, and the spokes on each portion forming a set of spokes arranged at an angle to the spokes on the other portion, each spoke in each section being cut apart from the adjacent spokes, a hub, and means for securing the spokes about the hub.

2. A metal wheel comprising two sections, each of which has felloe, web, and spoke portions, means for permanently securing the web portions of the two sections together, the spokes of one portion being secured to the hub on a side of the wheel opposite to that of which the web of the same portion forms a part, said spoke ends being secured about a spoke spacing member in the region of the hub.

3. A metal wheel comprising two sections, each of which has felloe, web, and spoke portions, means for permanently securing the web portions of the two sections together, the felloe portions complementing each other to form a rim seat, and the spoke portions of one section passing between spoke portions of the other section and being integral with a web portion of the first mentioned section arranged on the opposite side of the wheel, the spoke ends of both sections being secured about a spoke spacing member in the region of the hub.

4. A metal wheel comprising two sections, each of which has felloe, web and spoke portions, each web portion having a continuous plane inner surface engaging a similar plane surface on the web portion of the other section, in the central axial plane of the wheel, means in the said plane for permanently securing together the said surfaces, each web having a juncture with a spoke portion extending across the said axial plane to the opposite side of the hub, the felloe portions being bent outwardly from the webs to form a rim seat, having an inclined face cooperating with a corresponding face on the rim, and means for securing the rim on the rim seat.

5. A metal wheel comprising two sections, each of which has felloe, web and spoke portions forming a single integral unit, the web and felloe portions of one section forming a part of the side of the wheel opposite to that of which the spokes of that same section form a part, and a hub to which the spoke ends of both sections are secured.

CHARLES SCHENCK.
LEWIS FINE.
EMIL IBACH.